US012601278B1

(12) United States Patent
Richardson et al.

(10) Patent No.: US 12,601,278 B1
(45) Date of Patent: Apr. 14, 2026

(54) THROUGH-CASING GUIDE VANE MECHANISM FOR GAS TURBINE ENGINES

(71) Applicant: Pratt & Whitney Canada Corp., Longueuil (CA)

(72) Inventors: Tyler Richardson, Toronto (CA); Nathan Tomes, Hamilton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 19/249,757

(22) Filed: Jun. 25, 2025

(51) Int. Cl.
*F01D 17/16* (2006.01)
*F02C 9/22* (2006.01)

(52) U.S. Cl.
CPC ........... *F01D 17/162* (2013.01); *F01D 17/16* (2013.01); *F02C 9/22* (2013.01); *F05D 2260/50* (2013.01)

(58) Field of Classification Search
CPC ...... F01D 17/16; F01D 17/162; F01D 17/165; F02C 9/22
See application file for complete search history.

(56) References Cited

U.S. PATENT DOCUMENTS

| | | | |
|---|---|---|---|
| 3,574,479 A | 4/1971 | Barnard | |
| 3,801,216 A | 4/1974 | Holzhauer et al. | |
| 4,720,237 A | 1/1988 | Weiner et al. | |
| 11,371,380 B2 * | 6/2022 | Poick | F01D 9/042 |

FOREIGN PATENT DOCUMENTS

| | | | |
|---|---|---|---|
| RU | 2674173 C1 | 12/2018 | |
| RU | 191357 U1 | 8/2019 | |
| RU | 2696839 C1 | 8/2019 | |

* cited by examiner

*Primary Examiner* — Christopher R Legendre
(74) *Attorney, Agent, or Firm* — CANTOR COLBURN LLP

(57) ABSTRACT

Systems for actuating a plurality of guide vanes arranged about an engine axis include a unison ring is operably connected to each of the guide vanes to impart rotation to the guide vanes about a respective guide vane axis. A guide vane actuator assembly includes an actuator, an actuating rod, a boss rod connected to the actuating rod with the actuating rod connected to a slotted end of the boss rod, a jointed boss member defining a through hole through a housing and supporting the boss rod, and a connecting rod operably connecting the boss rod to a bracket, with the bracket connected to the unison ring. The actuator is configured to apply an actuating force to the actuating rod to apply the actuating force to the unison ring and control the rotation of the guide vanes about the respective guide vane axes.

20 Claims, 7 Drawing Sheets

THROUGH-CASING GUIDE VANE MECHANISM FOR GAS TURBINE ENGINES

BACKGROUND

Embodiments of the present disclosure pertain to the art of gas turbine engines, and more particularly to through-casing guide vane actuation mechanisms.

Aircraft engines, such as main engines and auxiliary power units, rely upon rotating components to generate thrust and/or power. The rotating components are mounted to, rotationally attached, and/or integrated as a single piece with one or more engine shafts within the engine. The engine shafts are typically supported on one or more bearing assemblies. Compressor guide vane actuation is fundamental to engine operating efficiency and control. Such guide vane actuation requires a mechanism to rotate the guide vanes locally about individual radially oriented axes, typically with a ring-type mechanism. Conventionally, actuators may be mounted directly on an outer shroud or casing of the engine about the compressor section within which the guide vanes are mounted. As engine configurations are reduced in size (e.g., smaller applications with less available space) and/or engines are reconfigured to incorporate additional efficiency-improving systems, such conventional actuator systems may require cutting holes in structural casings to pass actuating rods through the casing to connect to the respective guide vanes. That is, as the available space is reduced, incorporating each system becomes more challenging. Further, cutting holes in the structural casing can lead to vibration and durability issues, and thus the conventional actuator systems may not be useable in smaller engine configurations compared to conventional systems.

BRIEF DESCRIPTION

According to some embodiments, gas turbine engine guide vane actuation systems are provided. The systems for actuating guide vanes include a plurality of guide vanes arranged radially inward from a housing and about an engine axis, a unison ring operably connected to each of the plurality of guide vanes, the unison ring configured to rotate about the engine axis to impart rotation to each of the plurality of guide vanes about a respective guide vane axis, and a guide vane actuator assembly. The guide vane actuator assembly includes an actuator, an actuating rod, a boss rod operably connected to the actuating rod, wherein the actuating rod is connected to a slotted end of the boss rod, a jointed boss member defining a through hole through the housing and supporting the boss rod, and a connecting rod operably connecting the boss rod to a bracket, wherein the bracket is connected to the unison ring. The actuator is configured to apply an actuating force to the actuating rod, through the boss rod and the connecting rod, to apply the actuating force to the unison ring and control the rotation of the plurality of guide vanes about the respective guide vane axes.

In addition to one or more of the features described herein, or as an alternative, further embodiments of the gas turbine engine guide vane actuation systems may include that the boss rod is radially fixed relative to the engine axis by the jointed boss member.

In addition to one or more of the features described herein, or as an alternative, further embodiments of the gas turbine engine guide vane actuation systems may include a rotation pin, wherein the boss rod is pivotably mounted to the jointed boss member via the rotation pin.

In addition to one or more of the features described herein, or as an alternative, further embodiments of the gas turbine engine guide vane actuation systems may include a spherical joint connecting the boss rod to the connecting rod.

In addition to one or more of the features described herein, or as an alternative, further embodiments of the gas turbine engine guide vane actuation systems may include that the rotation pin is integrally formed with the boss rod.

In addition to one or more of the features described herein, or as an alternative, further embodiments of the gas turbine engine guide vane actuation systems may include that the rotation pin is configured to pivotably engage with a bushing of the jointed boss member.

In addition to one or more of the features described herein, or as an alternative, further embodiments of the gas turbine engine guide vane actuation systems may include a bushing in the jointed boss member, wherein the boss rod is a torsion rod configured to rotate about a torsion rod axis.

In addition to one or more of the features described herein, or as an alternative, further embodiments of the gas turbine engine guide vane actuation systems may include a first connecting link operably connecting the actuating rod to a first end of the torsion rod and a second connecting link operably connecting a second end of the torsion rod to the connecting rod.

In addition to one or more of the features described herein, or as an alternative, further embodiments of the gas turbine engine guide vane actuation systems may include that the first connecting link and the second connecting link are each connected to the boss rod by a respective spherical joint.

In addition to one or more of the features described herein, or as an alternative, further embodiments of the gas turbine engine guide vane actuation systems may include a plurality of guide pins operably connected to the unison ring and a plurality of guide slot elements operably connected to the plurality of guide vanes, wherein in each guide vane of the plurality of guide vanes includes a respective guide slot element of the plurality of guide slot elements. The unison ring is configured to rotate and apply a rotational force to plurality of guide pins and each of the plurality of guide slot elements are configured to be rotated about the respective guide vane axis in response to the rotational force applied to the plurality of guide pins.

In addition to one or more of the features described herein, or as an alternative, further embodiments of the gas turbine engine guide vane actuation systems may include that the jointed boss member is welded to the housing.

In addition to one or more of the features described herein, or as an alternative, further embodiments of the gas turbine engine guide vane actuation systems may include that the actuator is a linear actuator.

In addition to one or more of the features described herein, or as an alternative, further embodiments of the gas turbine engine guide vane actuation systems may include that the plurality of guide vanes define a stator of a compressor of the gas turbine engine.

According to some embodiments, aircraft gas turbine engines are provided. The turbine engines include a compressor section and a turbine section arranged along an engine axis. At least one of the compressor section and the turbine section includes a housing, a rotor arranged within the housing and having a plurality of blades, a stator arranged within the housing and comprising a plurality of guide vanes, with the plurality of guide vanes being arranged radially inward from the housing and about the engine axis, a unison ring operably connected to each of the plurality of guide vanes, the unison ring configured to rotate about the engine axis to impart rotation to each of the plurality of guide vanes about a respective guide vane axis, and a guide vane actuator assembly. The guide vane actuator assembly includes an actuator, an actuating rod, a boss rod operably connected to the actuating rod, a jointed boss member defining a through hole through the housing and supporting the boss rod, and a connecting rod operably connecting the boss rod to a bracket, with the bracket being connected to the unison ring. The actuator is configured to apply an actuating force to the actuating rod, through the boss rod and the connecting rod, to apply the actuating force to the unison ring and control the rotation of the plurality of guide vanes about the respective guide vane axes.

In addition to one or more of the features described herein, or as an alternative, further embodiments of the aircraft gas turbine engines may include that the boss rod is radially fixed relative to the engine axis by the jointed boss member.

In addition to one or more of the features described herein, or as an alternative, further embodiments of the aircraft gas turbine engines may include a rotation pin in the jointed boss member, wherein the boss rod is a pivot rod configured to pivotably rotate about the rotation pin.

In addition to one or more of the features described herein, or as an alternative, further embodiments of the aircraft gas turbine engines may include a bushing in the jointed boss member, wherein the boss rod is a torsion rod configured to rotate about a torsion rod axis.

In addition to one or more of the features described herein, or as an alternative, further embodiments of the aircraft gas turbine engines may include a first connecting link operably connecting the actuating rod to a first end of the torsion rod and a second connecting link operably connecting a second end of the torsion rod to the connecting rod.

In addition to one or more of the features described herein, or as an alternative, further embodiments of the aircraft gas turbine engines may include that a plurality of guide pins operably connected to the unison ring and a plurality of guide slot elements operably connected to the plurality of guide vanes, wherein in each guide vane of the plurality of guide vanes includes a respective guide slot element of the plurality of guide slot elements. The unison ring is configured to rotate and apply a rotational force to plurality of guide pins, and each of the plurality of guide slot elements are configured to be rotated about the respective guide vane axis in response to the rotational force applied to the plurality of guide pins.

In addition to one or more of the features described herein, or as an alternative, further embodiments of the aircraft gas turbine engines may include that the actuator is fixedly mounted to a radial outward surface of the housing.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
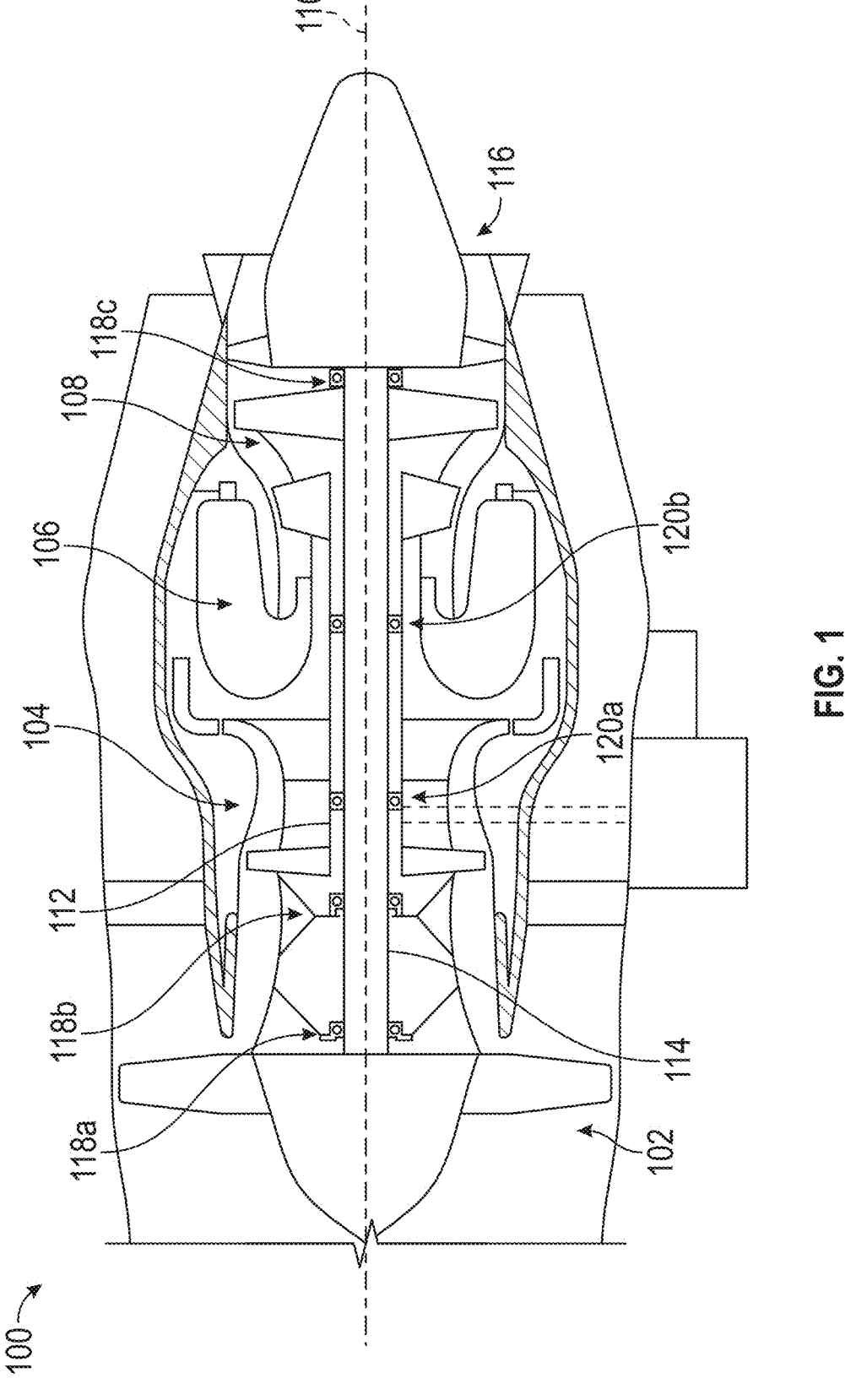
FIG. 1 is a schematic illustration of a gas turbine engine that may incorporate embodiments of the present disclosure.

FIG. 1 is a schematic illustration of a gas turbine engine 100, such as an aircraft engine. The gas turbine engine 100 may be representative of a main aircraft engine configured to generate power and/or thrust, an auxiliary power unit configured to generate power, or the like, as will be appreciated by those of skill in the art. The gas turbine engine 100, in this non-limiting illustrative configuration, includes a fan section 102, a compressor section 104, combustor section 106, and a turbine section 108. The gas turbine engine 100 may be configured with two spools or shafts arranged along an engine axis 110, such as with a high-speed shaft 112 and a low-speed shaft 114. In such configurations, the gas turbine engine 100 may include a low-pressure compressor of the compressor section 104 and a low-pressure turbine of the turbine section 108 each operably coupled to the low-speed shaft 114. Similarly, a high-pressure compressor of the compressor section 104 and a high-pressure turbine of the turbine section 108 may each be operably coupled to the high-speed shaft 112. It will be appreciated that other engine configurations are possible without departing from the scope of the present disclosure.

In operation, the fan section 102 is configured to direct at least a portion of a core flow into a core flow path that passes into the compressor section 104 for compression of the incoming air. The compressed air is then directed into the combustor section 106 for combustion with fuel. The combusted gases are then expanded through the turbine section 108, which drives rotation of the engine shafts 112, 114, and then the expanded combustion gases are expelled through a nozzle section 116 of the gas turbine engine 100. In some embodiments, the gas turbine engine 100 may be configured in a bypass arrangement, as will be appreciated by those of skill in the art.

As schematically illustrated in FIG. 1, the low-speed shaft 114 is rotationally supported within the gas turbine engine 100 by a number of axially spaced-apart bearing assemblies 118a-c that are concentrically mounted about the engine axis 110 of the gas turbine engine 100. The low-speed shaft 114 is supported at its front, upstream, or forward end by a first bearing assembly 118a and a second bearing assembly 118b and at a rear, downstream, or aft end thereof by a third bearing assembly 118c. The high-speed shaft 112 may be rotationally supported on the low-speed shaft 114 via a set of axially spaced-apart bearing assemblies, with a first bearing assembly 120a arranged at a front, upstream, or forward end of the high-speed shaft 112 and a second bearing assembly 120b arranged at a rear, downstream, or aft end of the high-speed shaft 112.

The compressor section 104 and the turbine section 108 may each be configured with sets of rotating components (e.g., rotors having rotor blades) and stationary components (e.g., guide vanes) arranged axially to compressor and expand gases flowing through the gas turbine engine 100. The guide vanes may be required to be rotated about a vane axis, such as a radially extending axis relative to the engine axis 110 that passes through a pivot point of the respective guide vane. Such rotation of the guide vanes can be performed to guide and direct flow through the respective engine component (e.g., compressor or turbine). The actuation or rotation of the guide vanes may be a fundamental operation to engine operating efficiency and control. The guide vane actuation or rotation may require a mechanism to rotate the guide vanes locally about an individual axis of each guide vane using a ring-type mechanism. Typically, the actuator used to rotate the guide vanes is mounted directly on the outer shroud or casing within which the guide vanes are mounted. However, in engines having smaller configurations than conventional configurations, such as those with less available space, the conventional actuator and guide vane configuration is not possible. This is because with a smaller profile or space to use, the actuator must be mounted on an external structural casing/housing, and holes are required to be cut into the structural casing/housing to pass actuating rods therethrough to connect to respective guide vanes. Cutting holes in the structural casing may allow for increased vibration and/or result in durability issues related to the structural casing, guide vanes, the actuator, and/or other components of the gas turbine engines.

Figure 2:
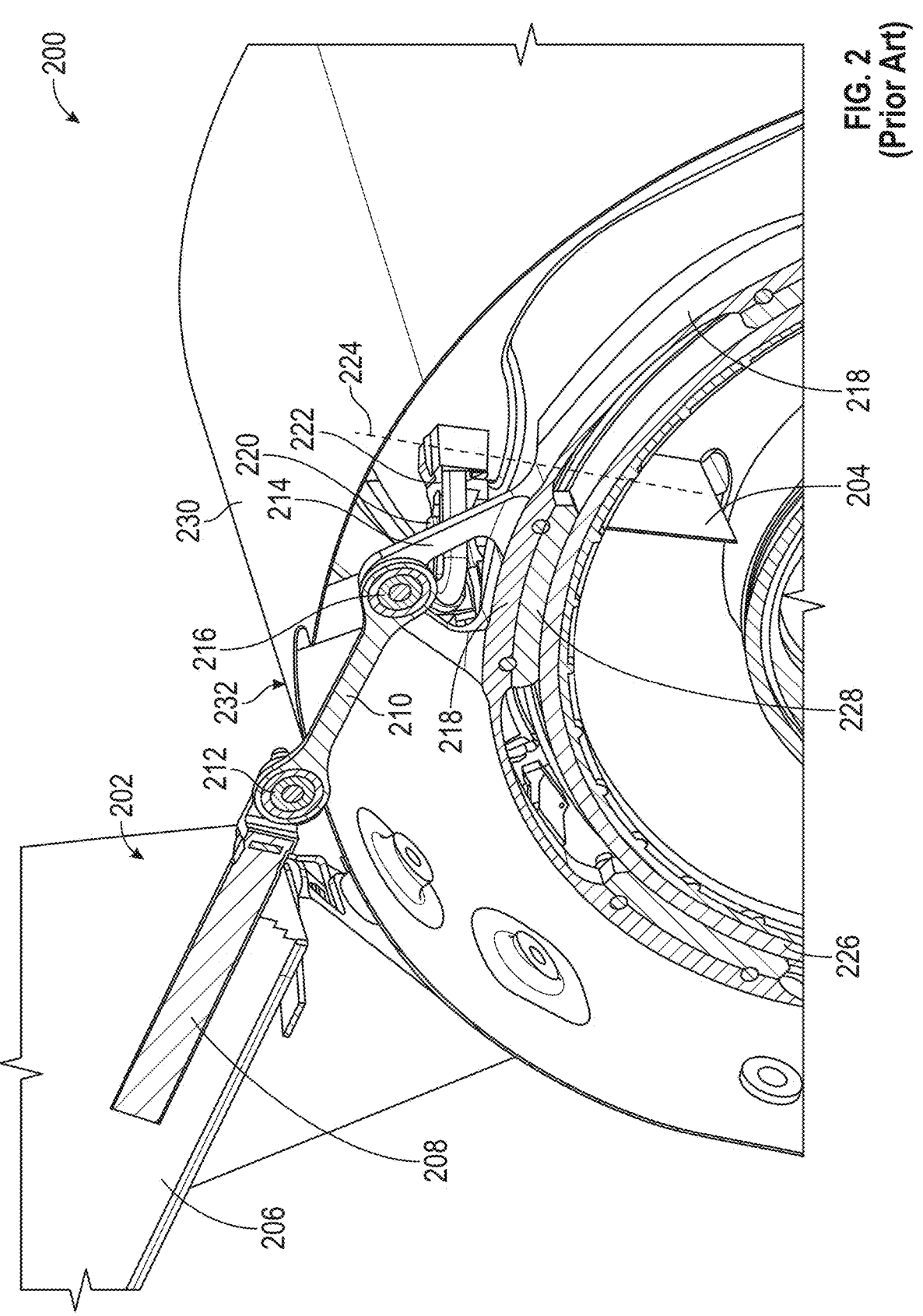
FIG. 2 is a schematic illustration of a conventional guide vane actuation system.

Referring to FIG. 2, a schematic illustration of a conventional configuration of a compressor section 200 having a guide vane actuator assembly 202 is shown. The guide vane actuator assembly 202 is configured to control operation and actuation of a set of guide vanes 204 (one shown for ease of illustration). The guide vane actuator system 202 includes an actuator 206, an actuating rod 208, and a connecting rod 210. The connecting rod 210 is pivotably connected at a first pivot 212 to the actuating rod 208 and pivotably connected to a bracket 214 at a second pivot 216. The bracket 214 is coupled to a unison ring 218. The unison ring 218 is operably connected to a plurality of guide pins 220, which are in turn operably coupled to respective guide slot elements 222. The guide slot elements 222 are slotted structures that are each pivotably connected to a respective guide vane 204. The guide slot elements 222 are configured to be rotated about a respective vane rotation axis 224 by application of force received from the guide pins 220. The unison ring 218 is rotationally or movingly supported radially outward from a guide vane platform 226 by one or more bumper pads 228.

As shown, the actuator 206 is arranged radially outward from a compressor case 230. To enable the connection between the actuator 206 and the guide vanes 204, a casing cutout 232 is formed in the compressor case 230. The casing cutout 232 is a hole or aperture that is cut from the material of the compressor case 230. The size of the casing cutout 232 is made to allow for a necessary force application from the actuator to be directed through the actuating rod 208, the connecting rod 210, and into the bracket 214 and unison ring 218. As the actuating rod 208 is operated linearly (e.g., extension and retraction), the bracket 214 will be moved circumferentially about an engine axis thereby causing the guide pins 220 to be moved circumferentially. As the guide pins 220 are moved the guide slot elements 222 will be pivoted about the vane rotation axis 224, causing the guide vanes 204 to rotate about the vane rotation axis 224. It is noted that because the motion provided from the actuator 206 is linear, there must be a conversion to rotational motion as the unison ring 218 is moved. Accordingly, the connecting rod 210 is provided with the first pivot 212 and the second pivot 216, as well as the unison ring 218 being guided by the bumper pads 228, thereby converting the linear motion of the actuator rod 208 to rotational (circumferential) motion of the unison ring 218 and in turn rotating the guide vanes 204 about the respective vane rotation axes 224.

The casing cutout 232 is relatively large to accommodate the angled insertion of the connecting rod 210 through the casing cutout 232. To allow for the necessary assembly stack up, assembly, and linear motion and pivoting about the first and second pivots 212, 216, the casing cutout 232 must be sufficiently large. However, as engine sizes are reduced, the available space for both mounting the actuator 206 and arranging the rods 208, 210 is also reduced, making application of the configuration shown in FIG. 2 difficult to implement in the smaller engine configurations. Additionally, the large casing cutout 232 can result in additional vibrations during operation, which can cause unwanted operational vibrations and/or increase wear on parts of the system.

In view of the above and other considerations, in accordance with embodiments of the present disclosure, reduced profile guide vane actuation systems are provided. The guide vane actuation systems of the present disclosure can eliminate the need for large holes within the casing/housing while controlling guide vane orientation. In accordance with some embodiments of the present disclosure, a jointed boss is welded to the engine casing and a rotation pin is arranged to pass through the jointed boss. The rotation pin can be acted upon by an actuator to cause rotation about a rotation axis of the rotation pin to then cause a circumferential motion of a unison ring. In other embodiments, rather than relying upon a pivoting rotation, a torsion rod may be passed through the jointed boss, and rotation of the torsion rod can cause circumferential motion of a unison ring.

Figure 3:
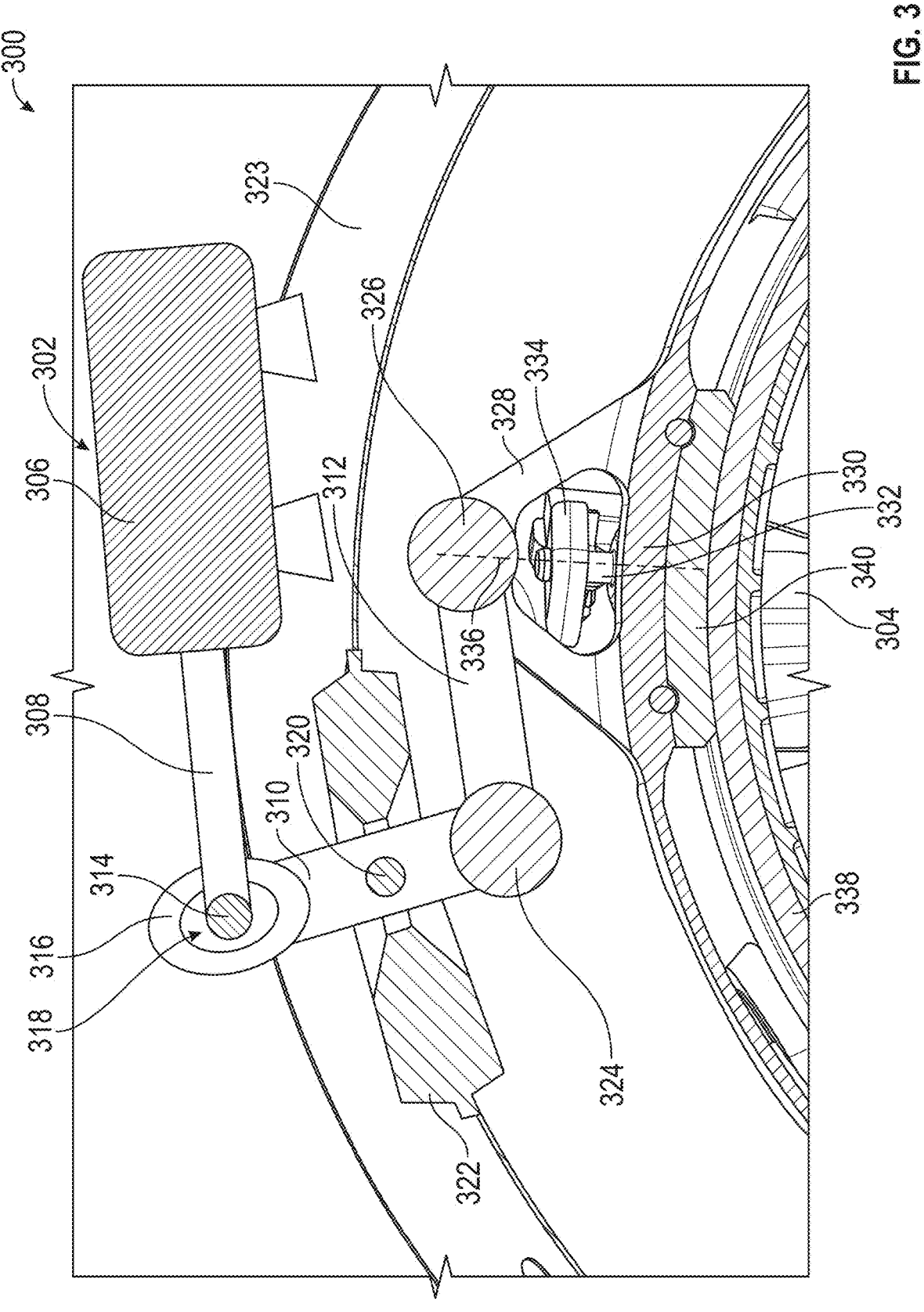
FIG. 3 is a schematic illustration of a guide vane actuation system in accordance with an embodiment of the present disclosure having a pivoting boss rod.

Referring now to FIG. 3, a schematic illustration of a portion of a compressor section 300 having a guide vane actuator assembly 302 in accordance with an embodiment of the present disclosure is shown. The guide vane actuator assembly 302 is configured to control operation and actuation of a set of guide vanes 304 (one shown for easy of illustration). The guide vane actuator system 302 includes an actuator 306, an actuating rod 308, a boss rod 310, and a connecting rod 312. The actuating rod 308 includes an actuating pin 314 at an end of the actuating rod 308. The actuating pin 314 is configured to connect to a slotted end 316 of the boss rod 310. As such, the actuating rod 308 operably connects the actuator 306 to the boss rod 310. The actuator 306 may cause linear motion of the actuating rod 308, and the actuating pin 314 is able to travel along a slot 318 of the slotted end 316 of the boss rod 310.

The actuator 306 may be fixedly and statically mounted to a housing 323 of the compressor section 300. That is, the actuator 306 itself may not pivot, rotate, or otherwise move relative to the housing 323. As such, in accordance with some embodiments, the actuator 306 is configured for only linear motion and any rotation is imparted via the connecting elements described herein. Accordingly, as shown, the actuating rod 308 is substantially parallel or extends directly from the actuator 306, and no angled or rotational motion is imparted from the actuator 306 to the actuating rod 308 (i.e., only linear motion). By fixedly mounting the actuator 306 to the housing 323, vibrations imparted by the actuator 306 may be minimized or eliminated.

The boss rod 310 is fixed in radial position (relative to an engine axis) by a rotation pin 320 that rotatably mounts the boss rod 310 to a jointed boss member 322. The jointed boss member 322 may be welded or otherwise fixedly attached to a housing 323 of the compressor section 300. In this configuration, the jointed boss member 322 is a pivot-jointed boss member that is configured to enable pivot or rotational motion to be conveyed through the housing 323. The boss rod 310 in this configuration is arranged as a pivot rod or rotational rod that is configured to rotate about the rotation pin 320. As the boss rod 310 is urged to move by application of force at the slotted end 316, the boss rod 310 will be rotated about the rotation pin 320. At an end of the boss rod 310 opposite the slotted end 316 is a first joint 324. The first joint 324 operably connects the boss rod 310 with the connecting rod 312. In accordance with some embodiments, the first joint 324 may be a spherical joint. At an opposite end of the connecting rod 312 from the first joint 324 is a second joint 326 that operably connects the connecting rod 312 with a bracket 328. In accordance with some embodiment, the second joint 326 may be a pivot joint. The bracket 328 is part of or connected to a unison ring 330. The unison ring 330 is configured similar to that shown and described above with respect to FIG. 2.

For example, as shown, the unison ring 330 is operably connected to a plurality of guide pins 332, which are in turn operably coupled to respective guide slot elements 334. The guide slot elements 334 are slotted structures that are each pivotably connected to a respective guide vane 304. The guide slot elements 334 are configured to be rotated about a respective vane rotation axis 336 by application of force received from the guide pins 332. The unison ring 330 is rotationally or movingly supported radially outward from a guide vane platform 338 by one or more bumper pads 340.

Figure 4:
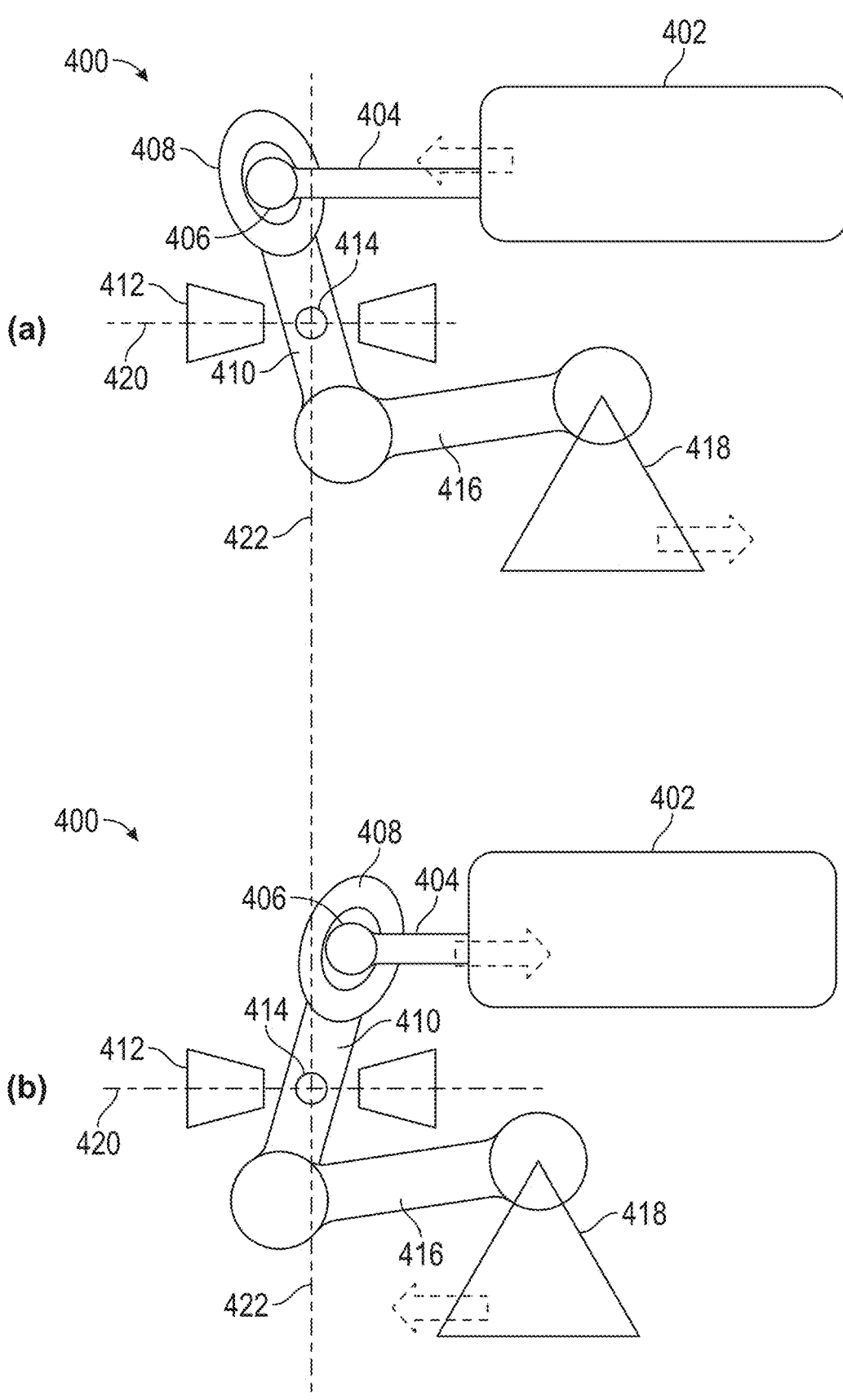
FIG. 4 illustrates two states of operation of a guide vane actuation system in accordance with an embodiment of the present disclosure having a pivoting boss rod.

Referring now to FIG. 4, schematic illustrations of the motion of a guide vane actuator system 400 in accordance with an embodiment of the present disclosure are shown. The guide vane actuator system 400 is schematically depicted in FIG. 4, but may be configured substantially similar to that shown and described with respect to FIG. 3. In FIG. 4, the top image labeled (a) represents a first state of operation and the bottom image labeled (b) represents a second state of operation. The guide vane actuator system 400 may be actuatable between the first and second states of operation, and transitioning between the two states results in changes in orientation and angling of guide vanes that are operably connected to the guide vane actuator system 400.

In the schematic illustration of FIG. 4, the guide vane actuator system 400 includes a fixed actuator 402 configured to impart linear motion to an actuating rod 404. The actuating rod 404 is operably coupled to the actuator 402 at one end, and includes an actuating pin 406 at an opposite end. The actuating pin 406 is configured to couple to and move within a slotted end 408 of a boss rod 410. The boss rod 410 is rotationally attached to or mounted to a jointed boss member 412 and configured to pivot or rotate about a rotation pin 414. In some configurations, the rotation pin 414 may be integrally formed with or part of the boss rod 410. In such configurations, the rotation pin 414 may be configured to sit within a slot or other recess in the jointed boss member 414. In other unitary/integral configurations, the jointed boss member may be formed as two halves arranged to be installed about the boss rod and integral rotation pin (e.g., split jointed boss member). In still further configurations, the rotation pin 414 may be inserted through aligned holes of the boss rod 410 and the jointed boss member 414. Accordingly, it will be appreciated that a variety of different mechanisms are contemplated within the teachings of the present disclosure.

The jointed boss member 412 may be a circular boss structure that is welded, attached using fasteners, bonded, integrally formed/machined, or otherwise affixed to a housing of a part of the engine in which the guide vane actuator system 400 is used. For example, the jointed boss member 412 may be welded or otherwise fixedly attached to a compressor housing that houses components of a compressor of a gas turbine engine, such as shown and described above. In accordance with some embodiments, the jointed boss member 412 and the rotation pin 414 are fixed relative to the engine, and do not move radially or axially relative to an engine axis. In configurations where the rotation pin 414 is integral with the boss rod 410, the rotation pin 414 will rotate with motion of the boss rod 410. At an opposite end of the boss rod 410 from the slotted end 408 a connecting rod 416. The connecting rod 416 is configured to provide connection to a bracket 418 that is part of or connected to a unison ring for actuating one or more guide vanes that are operably connected to the unison ring.

As noted, the rotation pin 414 is fixed radially and axially relative to an engine axis, and the boss rod 410 is configured to rotate about the rotation pin 414. As such, the boss rod 410 is rotationally attached to or connected to a case or housing via the jointed boss member 412, such as on the rotation pin 414. In configurations where the rotation pin 414 is part of or fixedly attached to the boss rod 410, the jointed boss member 412 may function as a bushing for the rotation pin 414. Line 420 shown in views (a) and (b) of FIG. 4 illustrate the radial position of the rotation pin 414 between an extended state (shown in view (a)) and a retracted state (shown in view (b)) of the actuating rod 404. As illustrated, the radial position of the rotation pin 414 does not change during the change between the extended and retracted states. Similarly, line 422 indicates the axial position of the rotation pin 414 during the changes between extended and retracted states of the actuating rod 404. As such, the only motion of the boss rod 410 is a rotation about the rotation pin 414.

During the extension of the actuating rod 404 by the actuator 402, the boss rod 410 is rotated about the rotation pin 414 and the connecting rod 416 is translated axially in a direction opposite of the linear direction of motion of the actuating rod 404. As the connecting rod 416 is urged axially by the boss rod 410, the bracket 418 will be moved similarly. The bracket 418 will be moved along a circumferential direction resulting in rotation of the unison ring about the engine axis, thereby causing operably connected guide vanes to be rotated about respective vane rotation axes, as described above.

Figure 5A:
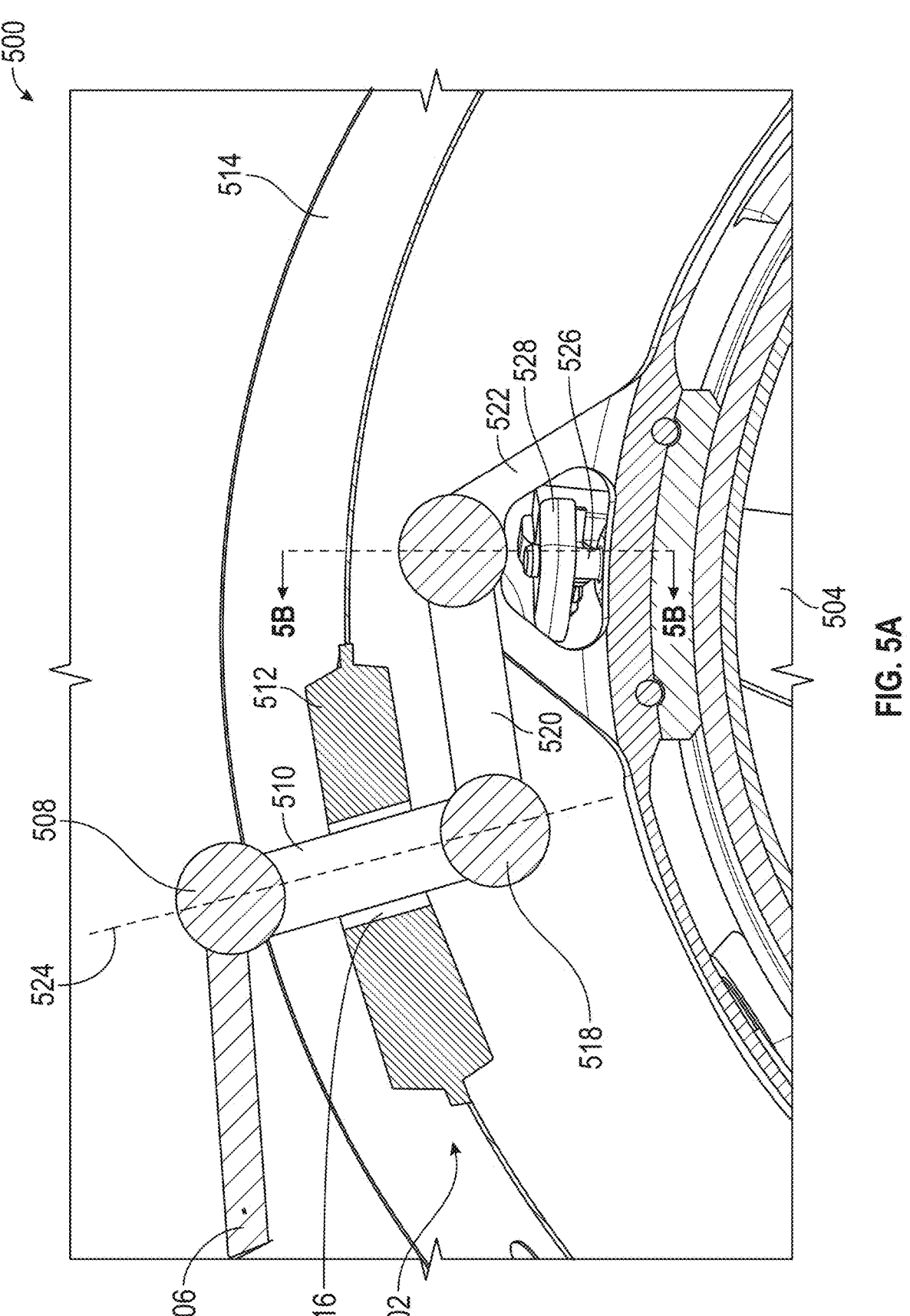
FIG. 5A is a schematic illustration of a guide vane actuation system in accordance with an embodiment of the present disclosure having a rotating boss rod.
Figure 5B:
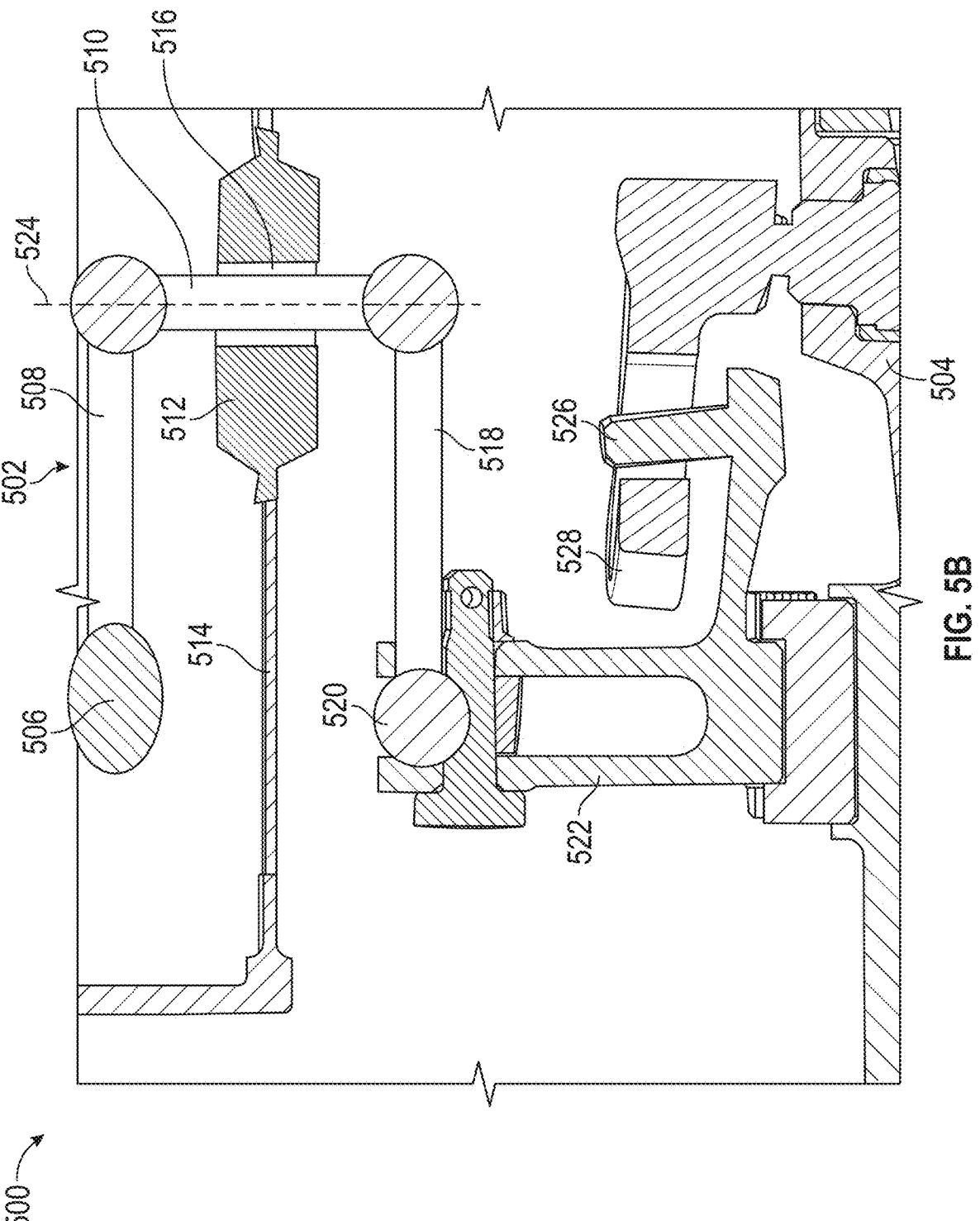
FIG. 5B is an alternative view of the guide vane actuation system of FIG. 5A.

Referring now to FIGS. 5A-5B, schematic illustrations of a portion of a compressor section 500 having a guide vane actuator assembly 502 in accordance with an embodiment of the present disclosure are shown. The guide vane actuator assembly 502 is configured to control operation and actuation of a set of guide vanes 504 (one shown for ease of illustration). The guide vane actuator system 502 includes an actuator (not shown), an actuating rod 506 that is connected to a first connecting link 508 (FIG. 5B). The first connecting link 508 connects to a boss rod 510 that extends radially inward and through a jointed boss member 512. The jointed boss member 512 may be fixedly attached to a housing 514, such as by welding, fasteners, bonding, and/or integrally formed/machined. The jointed boss member 512 in this configuration is a cylindrical-jointed boss member and includes or supports a bushing member 516 through which the boss rod 510 is rotationally supported. In this configuration, the boss rod 510 is arranged as a torsion rod for transferring torque from outside the housing 514 to inside the housing 514 through the jointed boss member 512. The bushing member 516 and the boss rod 510 are configured to operate as a cylindrical-type joint. Opposite the connection between the boss rod 510 and the first connecting link 508 is a second connecting link 518 connected to the boss rod 510. The first and second connecting links 508, 518 may be connected to the boss rod 510 by hinges or other joints. The second connecting link 518 operably connects the boss rod 510 with a connecting rod 520. The connecting rod 520 is attached to a bracket 522 at an end opposite from the second connecting link 518, such as by a joint (e.g., spherical joint).

In accordance with some embodiments, the relationship between the various components of the guide vane actuator assembly 502 may be defined to achieve a desired operation. For example, in accordance with some non-limiting embodiments, a mathematical relationship between lengths/distances of the components may be provided. In one such example, the length of the boss rod 510, from the bushing member 516, to the joint/connection with the first connecting link 508 may be referred to as R1, and the length of the boss rod 510, from the bushing member 516, to the joint/connection with the second connecting link 518 may be referred to as R2. The length of the first connecting link 508 may be referred to as L1, and the length of the second connecting link 518 may be referred to as L2. To minimize moment reactions at the bushing member 516, the components of the guide vane actuator assembly 502 may be defined as:

$$\frac{R1}{R2} = \frac{L1}{L2}.$$

In such a configured system, the force F1 applied from the actuator is related to the force F2 on the connecting rod 520 as:

$$\frac{L1}{L2} = \frac{F2}{F1}.$$

In operation, an actuator will apply linear motion to the actuating rod 506. The actuating rod 506 will apply a force to an end of the first connecting link 508, which applies a rotational force (e.g., torque) to an end of the boss rod 510. The boss rod 510 will then be rotated about a torsion rod axis 524 of the boss rod 510. The rotation of the boss rod 510 will apply a rotational force to the second connecting link 518, rotating the second connecting link 518 about the axis 524 and applying force to the connecting rod 520. Accordingly, the connecting rod 520 may apply a linear force to the bracket 522 to cause rotation of the connected guide vanes 504. FIG. 5B illustrates the connection between the bracket 522, a guide pin 526, and a guide slot element 528, similar to that shown and described above.

Figure 6A:
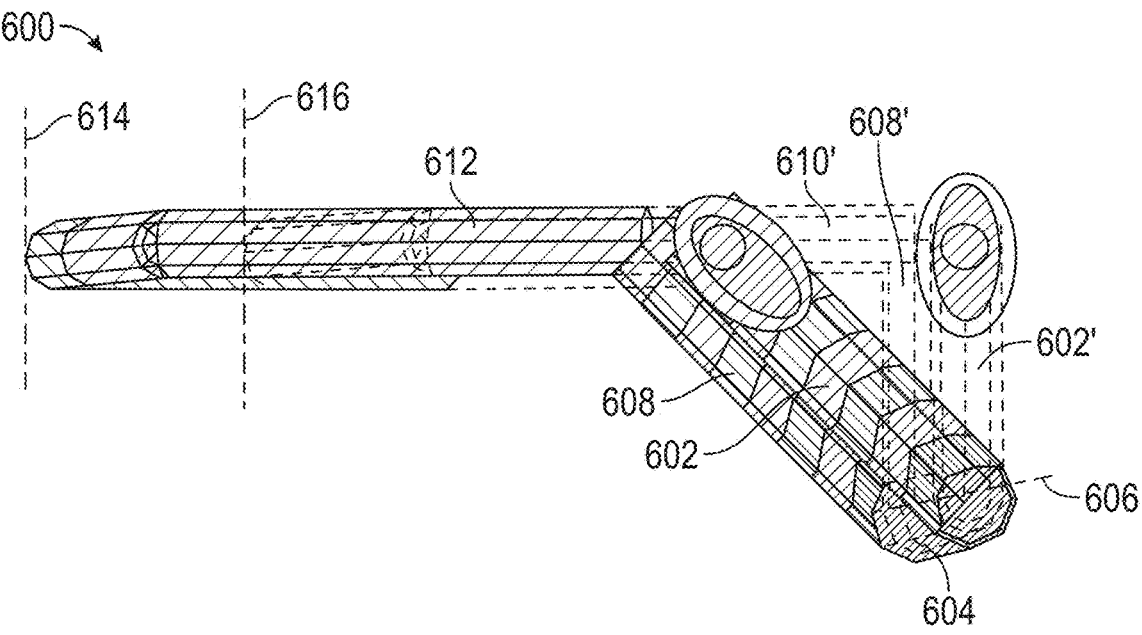
FIG. 6A illustrates two states of operation of a guide vane actuation system in accordance with an embodiment of the present disclosure having a rotating boss rod.
Figure 6B:
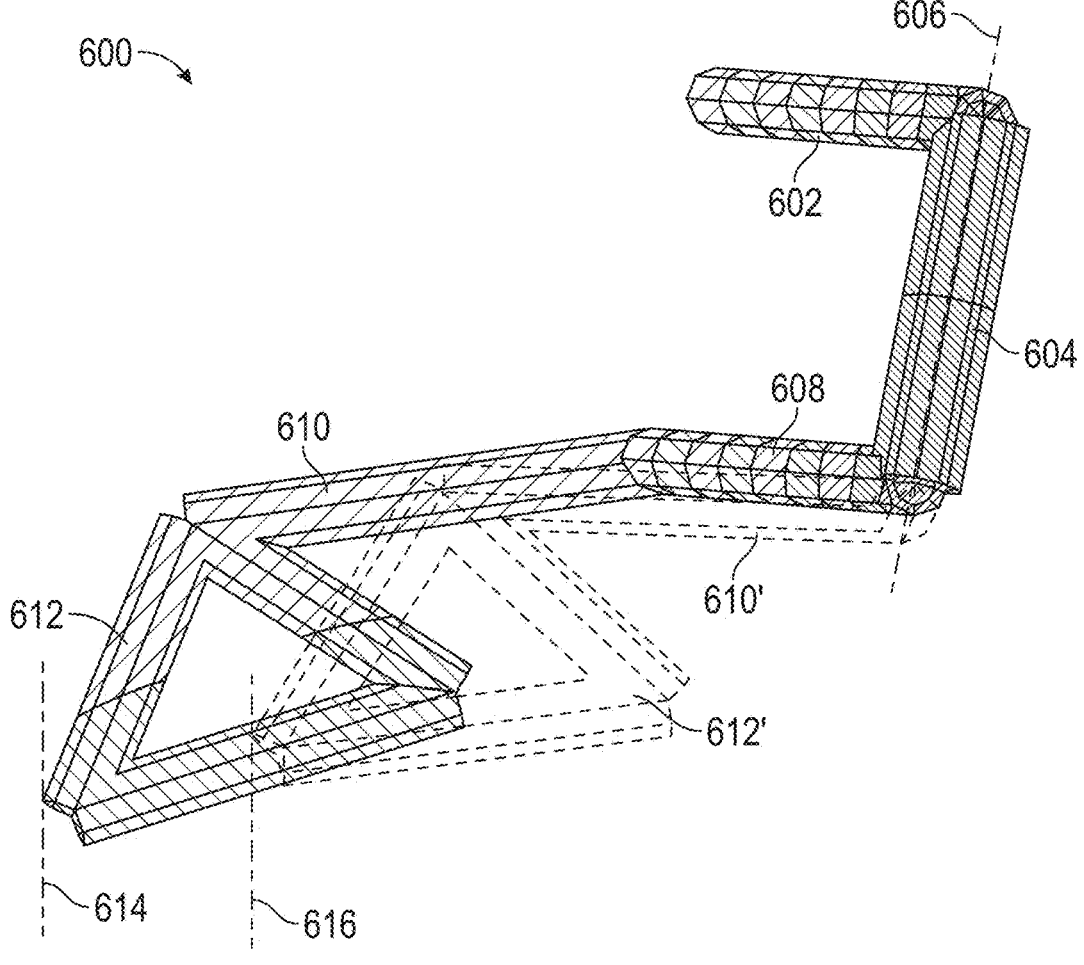
FIG. 6B illustrates the two states of operation of the guide vane actuation system of FIG. 6A in an alternative view.

Referring now to FIGS. 6A-6B, schematic diagrams of the actuation of components of a guide vane actuator assembly 600 in accordance with an embodiment of the present disclosure is shown. The guide vane actuator assembly 600 includes a first connecting link 602 that is operably connected to an actuating rod (not shown), similar to that shown and described above with respect to FIGS. 5A-5B. The first connecting link 602 is connected opposite from the actuating rod to a boss rod 604. The boss rod 604 is configured to extend through a jointed boss member having a bushing member, not shown for clarity ease of illustration, and thus is configured as a torsion rod. The boss rod 604 is configured to be rotated about a torsion rod axis 606. At an opposite end of the boss rod 604 from the first connecting link 602 is a second connecting link 608. The second connecting link 608 is connected to a connecting rod 610. The connecting rod 610 is connected to a bracket 612, which is part of or connected to a unison ring, as shown and described above.

FIG. 6A is a radially inward view showing the translation and rotation of the components of the guide vane actuator assembly 600 and FIG. 6B is a side elevation view showing the same translation and rotation as illustrated in FIG. 6A. As shown, in a first state of actuation the bracket 612 may be positioned at a first position 614. When guide vanes are to be adjusted or rotated within a gas path during operation, an actuator may apply a linear force upon the first connecting link 602 via an actuating rod. As the first connecting link 602 is acted upon by the actuating rod, the first connecting link 602 will apply a torque or rotational force to the boss rod 604 such that the boss rod 604 will rotated about the torsion rod axis 606. The rotation of the boss rod 604 about the torsion rod axis 606 will apply a similar rotational force or torque to the second connecting link 608, which will rotate about the torsion rod axis 606. The connection of the second connecting link 608 to the connecting rod 610 and bracket 612 will cause the bracket 612 to be moved along a circumference defined by the unison ring, shifting the bracket 612 to a second position, indicated at a second position 616. The arrangement of components in the second position are indicated by dashed line elements 602', 608', 610', and 612', shown in FIGS. 6A-6B.

As described herein, the various links, rods, and components of the guide vane actuator assemblies are coupled together to convert linear motion applied by an actuator into rotational motion of a bracket of a unison ring, with the rotation of the unison ring a tangential or circumferential motion about an engine axis. In accordance with embodiments of the present disclosure, the actuators are arranged external to a casing or housing of the compressor or other engine section that includes guide vanes to be rotated or actuated during use. The guide vane actuator assemblies of the present disclosure include an actuating rod that applies linear motion to a boss rod, which may be configured as a pivot rod (e.g., FIG. 3) or a torsion rod (e.g., FIGS. 5A-5B).

In accordance with embodiments of the present disclosure, each of the boss rods are movably fixed within or supported by a jointed boss member that is attached to or part of the casing/housing. In the case of the pivot rod, the pivot rod is rotationally supported by a rotation pin of the jointed boss member, and rotatable about the rotation pin. In the case of the torsion rod, the torsion rod is supported in the jointed boss member by a bushing. In each embodiment, the rod (pivot or torsion) is radially fixed to the jointed boss member relative to an engine axis, allowing for significantly smaller through-holes to be formed in the casing/housing as compared to conventional guide vane actuator systems.

As described above, the actuation of the guide vane actuator assemblies is provided by a linear actuator. However, such actuators are not intended to be limiting, but rather are provided for example purposes only. It will be appreciated that other types of actuators, such as direct drive electric motors, or the like, may be employed without departing from the scope of the present disclosure.

Advantageously, embodiments of the present disclosure are directed to improved guide vane actuator assemblies. The improved guide vane actuator assemblies may be used in relatively small profile or small configuration engines where space is limited. The guide vane actuator assemblies provide for mechanisms that reduce the size of holes cut through housings and casings of engines to achieve control of guide vanes. The guide vanes may be guide vanes of gas turbine engine rotational sections, such as compressor sections and/or turbine sections. The guide vanes are rotatable about vane rotation axes that are radial lines extending from an engine axis. Embodiments of the present disclosure are arranged to convert and transfer linear force through a housing and achieve a rotation of a unison ring about the engine axis, thereby actuating or rotating the guide vanes.

The term "about" is intended to include the degree of error associated with measurement of the particular quantity based upon the equipment available at the time of filing the application. The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made, and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure is not limited to the particular embodiment disclosed as the best mode contemplated for carrying out this present disclosure, but that the present disclosure will include all embodiments falling within the scope of the claims.

What is claimed is:

1. A system for actuating guide vanes of a gas turbine engine, the system comprising:
   a plurality of guide vanes arranged radially inward from a housing and about an engine axis;
   a unison ring operably connected to each of the plurality of guide vanes, the unison ring configured to rotate about the engine axis to impart rotation to each of the plurality of guide vanes about a respective guide vane axis; and
   a guide vane actuator assembly comprising:
      an actuator;
      an actuating rod;
      a boss rod operably connected to the actuating rod, wherein the actuating rod is connected to a slotted end of the boss rod;

a jointed boss member defining a through hole through the housing and supporting the boss rod; and
   a connecting rod operably connecting the boss rod to a bracket, wherein the bracket is connected to the unison ring,
   wherein the actuator is configured to apply an actuating force to the actuating rod, through the boss rod and the connecting rod, to apply the actuating force to the unison ring and control the rotation of the plurality of guide vanes about the respective guide vane axes.

2. The system of claim 1, wherein the boss rod is radially fixed relative to the engine axis by the jointed boss member.

3. The system of claim 1, further comprising a rotation pin, wherein the boss rod is pivotally mounted to the jointed boss member via the rotation pin.

4. The system of claim 3, further comprising a spherical joint connecting the boss rod to the connecting rod.

5. The system of claim 3, wherein the rotation pin is integrally formed with the boss rod.

6. The system of claim 3, wherein the rotation pin is configured to pivotally engage with a bushing of the jointed boss member.

7. The system of claim 1, further comprising a bushing in the jointed boss member, wherein the boss rod is a torsion rod configured to rotate about a torsion rod axis.

8. The system of claim 7, further comprising:
   a first connecting link operably connecting the actuating rod to a first end of the torsion rod; and
   a second connecting link operably connecting a second end of the torsion rod to the connecting rod.

9. The system of claim 8, wherein the first connecting link and the second connecting link are each connected to the boss rod by a respective spherical joint.

10. The system of claim 1, further comprising:
   a plurality of guide pins operably connected to the unison ring; and
   a plurality of guide slot elements operably connected to the plurality of guide vanes, wherein each guide vane of the plurality of guide vanes includes a respective guide slot element of the plurality of guide slot elements,
   wherein the unison ring is configured to rotate and apply a rotational force to the plurality of guide pins, and
   wherein each of the plurality of guide slot elements are configured to be rotated about the respective guide vane axis in response to the rotational force applied to the plurality of guide pins.

11. The system of claim 1, wherein the jointed boss member is welded to the housing.

12. The system of claim 1, wherein the actuator is a linear actuator.

13. The system of claim 1, wherein the plurality of guide vanes define a stator of a compressor of the gas turbine engine.

14. An aircraft gas turbine engine comprising:
   a compressor section and a turbine section arranged along an engine axis, wherein at least one of the compressor section and the turbine section comprises:
      a housing;
      a rotor arranged within the housing and comprising a plurality of blades;
      a stator arranged within the housing and comprising a plurality of guide vanes, wherein the plurality of guide vanes are arranged radially inward from the housing and about the engine axis;
      a unison ring operably connected to each of the plurality of guide vanes, the unison ring configured to rotate about the engine axis to impart rotation to each of the plurality of guide vanes about a respective guide vane axis; and a guide vane actuator assembly comprising:

an actuator;

an actuating rod;

a boss rod operably connected to the actuating rod;

a jointed boss member defining a through hole through the housing and supporting the boss rod; and a connecting rod operably connecting the boss rod to a bracket, wherein the bracket is connected to the unison ring, wherein the actuator is configured to apply an actuating force to the actuating rod, through the boss rod and the connecting rod, to apply the actuating force to the unison ring and control the rotation of the plurality of guide vanes about the respective guide vane axes.

15. The aircraft gas turbine engine of claim 14, wherein the boss rod is radially fixed relative to the engine axis by the jointed boss member.

16. The aircraft gas turbine engine of claim 14, further comprising a rotation pin in the jointed boss member, wherein the boss rod is a pivot rod configured to pivotably rotate about the rotation pin.

17. The aircraft gas turbine engine of claim 14, further comprising a bushing in the jointed boss member, wherein the boss rod is a torsion rod configured to rotate about a torsion rod axis.

18. The aircraft gas turbine engine of claim 17, further comprising:

a first connecting link operably connecting the actuating rod to a first end of the torsion rod; and a second connecting link operably connecting a second end of the torsion rod to the connecting rod.

19. The aircraft gas turbine engine of claim 14, further comprising:

a plurality of guide pins operably connected to the unison ring; and a plurality of guide slot elements operably connected to the plurality of guide vanes, wherein each guide vane of the plurality of guide vanes includes a respective guide slot element of the plurality of guide slot elements, wherein the unison ring is configured to rotate and apply a rotational force to the plurality of guide pins, and wherein each of the plurality of guide slot elements are configured to be rotated about the respective guide vane axis in response to the rotational force applied to the plurality of guide pins.

20. The aircraft gas turbine engine of claim 14, wherein the actuator is fixedly mounted to a radial outward surface of the housing.

* * * * *